United States Patent [19]

Weit

[11] Patent Number: 4,495,557

[45] Date of Patent: Jan. 22, 1985

[54] SWITCHING CONTROLLER DIRECTLY OPERABLE FROM AC

[75] Inventor: James G. Weit, Painesville, Ohio

[73] Assignee: Contraves Goerz Corporation, Pittsburgh, Pa.

[21] Appl. No.: 330,848

[22] Filed: Dec. 15, 1981

Related U.S. Application Data

[63] Continuation of Ser. No. 005,220, Jan. 22, 1979, abandoned.

[51] Int. Cl.³ .............................................. H02P 13/26
[52] U.S. Cl. .................................... 363/89; 318/345 B; 363/10; 363/87; 363/127; 363/129
[58] Field of Search ........................ 363/9-12, 363/29, 80, 85, 87, 127, 129, 159-162, 163, 63; 318/331, 341, 345 C, 345 CA, 345 B, 345 D

[56] References Cited

U.S. PATENT DOCUMENTS

| 3,246,228 | 4/1966 | Wickenhagen | 363/11 |
| 3,470,447 | 9/1969 | Gyugui et al. | 363/160 |
| 3,538,417 | 11/1970 | Nijhof et al. | 363/160 |
| 3,909,698 | 9/1975 | Nill | 363/79 |
| 4,017,777 | 4/1977 | Bailey | 363/124 |
| 4,346,432 | 8/1982 | Gurr | 363/129 |

FOREIGN PATENT DOCUMENTS

| 563683 | 6/1975 | Switzerland | 363/129 |
| 801122 | 9/1958 | United Kingdom | 323/282 |

OTHER PUBLICATIONS

International Journal of Electronics, vol. 41, No. 6, pp. 537-587, Dec. 1976.

Primary Examiner—William H. Beha, Jr.
Attorney, Agent, or Firm—Robert D. Yeager; Andrew J. Cornelius

[57] ABSTRACT

A high response motor controller is disclosed which operates directly from a multi-phase AC power line without a DC link. The controller directly converts power from a fixed frequency multi-phase input to a D.C. or variable frequency output current. The output frequency is not limited by the AC power line frequency and the switching frequency is independent of the AC power line frequency. Controlled switching devices are connected between the multi-phase power input line and the power output line. Analog input signals are compared with signals representative of actual motor currents to produce current error signals. These current error signals control the conduction state of the controlled switching output transistors by a two state modulation process. The controlled switching output devices required to conduct the commanded motor current are selected by sensing and logically comparing the relative voltages of the various AC input line phases to utilize the phase lines having the greatest potential difference therebetween.

3 Claims, 11 Drawing Figures

| TIME SEGMENT | RELATIVE PHASE POTENTIALS |
|---|---|
| SEGMENT 1 | PHASE A > PHASE B<br>PHASE A > PHASE C |
| SEGMENT 2 | PHASE B > PHASE A<br>PHASE B > PHASE C |
| SEGMENT 3 | PHASE C > PHASE A<br>PHASE C > PHASE B |
| SEGMENT 4 | PHASE C < PHASE A<br>PHASE C < PHASE B |
| SEGMENT 5 | PHASE A < PHASE B<br>PHASE A < PHASE C |
| SEGMENT 6 | PHASE B < PHASE A<br>PHASE B < PHASE C |

SWITCHING CONTROLLER DIRECTLY OPERABLE FROM AC

This is continuation of application Ser. No. 005,220, filed Jan. 22, 1979, now abandoned.

BACKGROUND OF THE INVENTION

1. Field of the Invention

This invention relates to motor controllers and more particularly to a high response motor control which operates directly from a multi-phase AC power line and provides a variable frequency output which is not dependent on the line frequency.

2. Description of the Prior Art

Prior art converters for converting a fixed frequency input to a variable frequency output normally employed a DC link from which the output switching devices function.

SUMMARY OF THE INVENTION

A power converter is disclosed which directly converts power from a fixed frequency multi-phase line input to a variable frequency AC output or a DC output. The disclosed controller is suitable for motor control in industrial applications. Motor current is controlled by two state modulation techniques without the need for a DC power link between the input and the output of the controller. The controller allows continuous regeneration to be fed back into the AC power lines.

Output devices which can be switched on and off in response to a control signal are utilized between the line input and the controller output. These devices, such as gate turn off thyristor, are capable of triggered commutation. Suitable logic is provided for selecting the controlled devices which are conducting. The output bridge consists of a three phase converter with twelve output devices which are connected between the input and output. Each controlled switching output device includes a pair of controlled elements connected in anti-parallel to allow current flow in either direction. When supplying current to a motor the devices are controlled to allow current to flow from the highest potential AC line through the motor windings, to produce the proper motor current and then to the lowest potential AC line. The motor is provided with individual control by switching on and off the transistors which will provide the correct voltage to produce the required current under the given AC line condition.

The controller includes line sensing circuitry which monitors the incoming phase lines and through suitable sequencing logic determines which controlled output devices should be conducting. For motor control a current feedback signal, related to the motor current, is combined with an input current command to provide an error signal. The error signal controls the conduction state of the controlled switching output transistors selected by the sequencing logic.

It is an object of this invention to teach a controller which directly converts power from a fixed frequency multiphase input to variable frequency or DC output.

BRIEF DESCRIPTION OF THE DRAWINGS

For a better understanding of the invention reference may be had to the preferred embodiment exemplary of the invention shown in the accompanying drawings wherein.

DESCRIPTION OF THE PREFERRED EMBODIMENT

Figure 1:
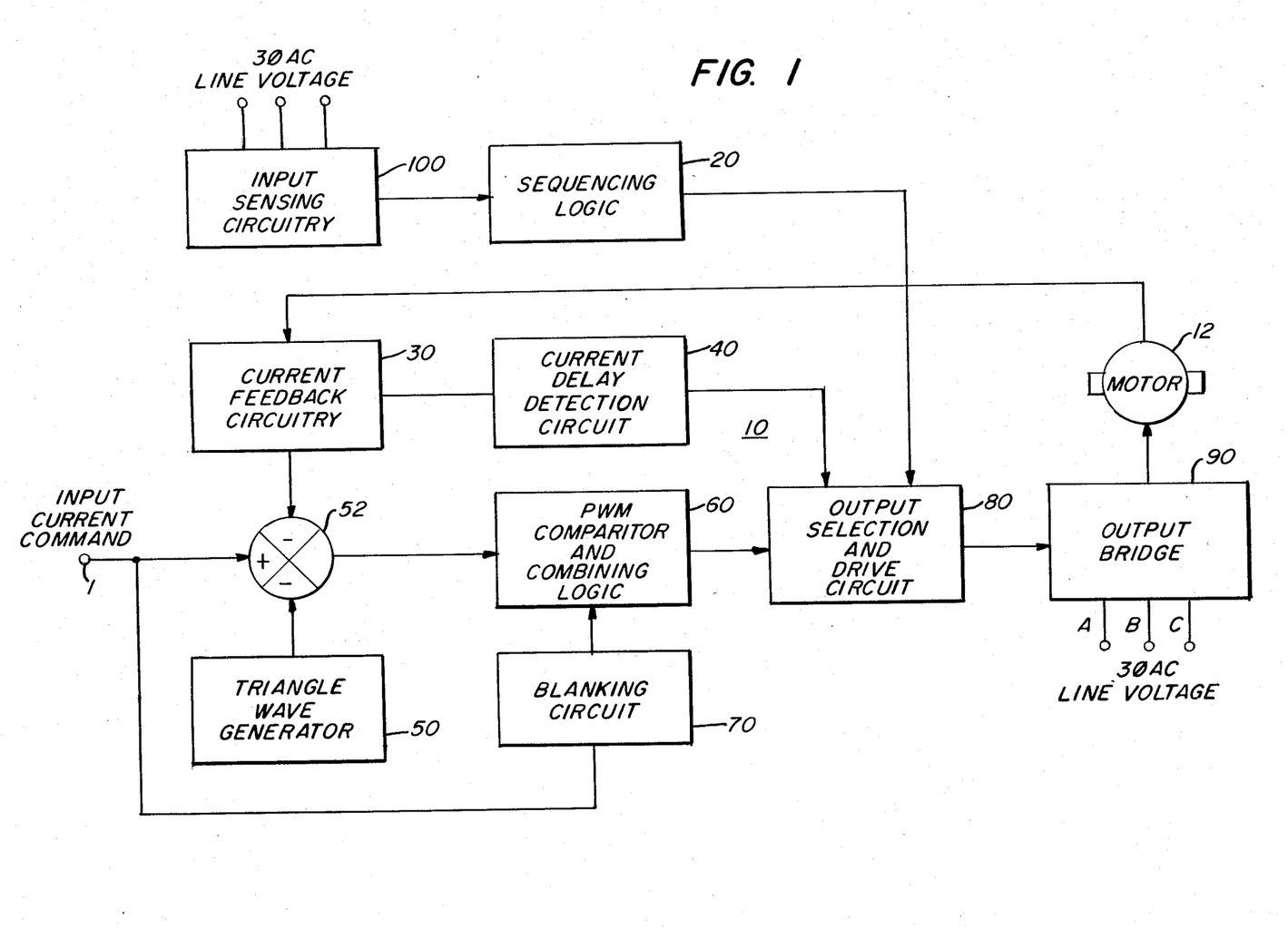
FIG. 1 is a block diagram of a controller utilizing the teaching of the present invention.

Referring now to the drawings and FIG. 1 in particular there is shown a block diagram of a controller 10 constructed according to the teaching of the present invention. Controller 10 provides for direct variable frequency control of a single phase motor from a fixed frequency three phase AC line. The input sensing circuitry monitors the incoming three phase line potential. The output of the input sensing circuit 100 is connected to sequencing logic 20 which selects the output devices in the output bridge 90 which may be made conducting. Sequencing logic 20 selects the appropriate device which may be turned on for connecting the line voltage to the load. The output devices which connect the motor 12 to the lines having either the highest or lowest potential are the one which may be controlled. That is, sensing circuit 100 and sequencing logic 20 select, for every time period, the output devices which would be conducting if the output devices were switched on for 3 phase full wave bridge rectification of the line voltage. These selected devices are the ones which may be switched on at the proper times to provide the desired output.

The output bridge 90 consists of a plurality of devices which can be rapidly turned on and off in response to a command signal. An input current command is summed with a current feedback signal and a triangular wave signal at a summing junction 52. The triangular wave signal is provided by a triangle wave generator 50 which can be of the type which is well-known in the prior art. The current feedback signal is provided by a feedback circuit 30. The output of summing junction 52 is processed by a pulse width modulator (PWM) comparator and combining circuit 60 which determines the on-off duty cycle of the bridge output devices which are selected by the sequencing logic 20.

A blanking circuit 70 is provided to prevent common conduction in the output bridge circuit 90 during current reversals. Blanking circuit 70 disables all controlled devices in the output bridge during current reversal. Current delay detection circuit 40 is provided to assure proper commutation during current reversals. The output selection and drive circuitry feeds control signals to the proper output controlled switching devices in output bridge 90. One way of coupling the control signal to the output bridge is by way of optical couplers.

Figure 2:
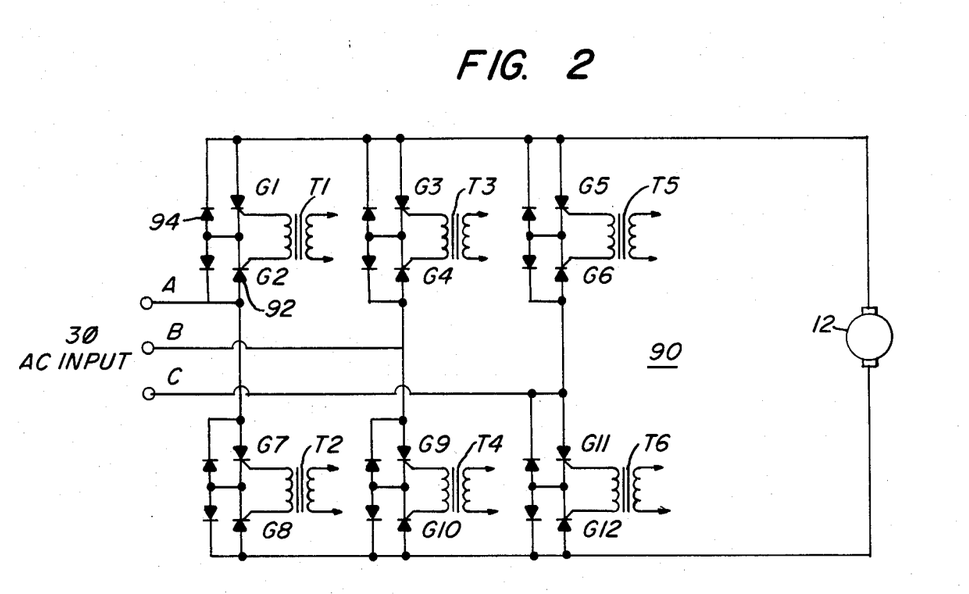
FIG. 2 is a bridge connected output of gate turn off thyristors which can be utilized in a controller according to the present invention.

Referring now to FIG. 2 there is shown an output bridge circuit suitable for use with the controller of FIG. 1 to directly provide variable voltage AC or DC output from a three phase AC input. Current to motor 12 can be controlled by two state modulation techniques without the need for a DC supply or AC bus. This arrangement also allows continuous regeneration to the AC line. The circuit of FIG. 2 could become the DC power supply for an AC drive or three similar circuits can be used to control the three windings of a 3 phase AC motor. Using three circuits similar to FIG. 2 would require 36 devices for controlling a three phase motor. It is possible by an appropriate circuit to use only 18 devices for controlling a 3 phase motor.

Presently a DC bus is utilized to make voltage available at any instant in a PWM and two state DC motor controller. The chief advantage of the DC bus arrangement is the dramatic increase in band width obtained over phase controlled power output devices wherein commutation can occur only at a point in time fixed by the line frequency. With gate turn off thyristors, as shown in FIG. 2, commutation is initiated by a gate signal and it is not required that the current independently be brought to zero by some other method. The main disadvantage of a static DC bus is that auxiliary means must be employed to handle regenerative energy. The disclosed circuit shown in FIG. 2 allows the regenerative power to be fed directly back into the AC lines. The circuit of FIG. 2 is capable of supplying the same bandwidth as a PWM or two state controller operating from a DC bus, and at the same time allows regeneration energy to be returned to the AC line. Gate turn off thrysistor 92 is not a reverse blocking device, thus the series with arrangement with antiparallel rectifiers 94 is required. Twelve controlled switching devices, G1 through G12, each of which comprises a gate turn off thyristor 92 and a diode 94 are required for supplying DC motor 12 from a 3 $\phi$ supply. The control signals can be coupled to the controlled switching devices G1 through G12 by approximate transformers T1 through T6.

Figure 3:
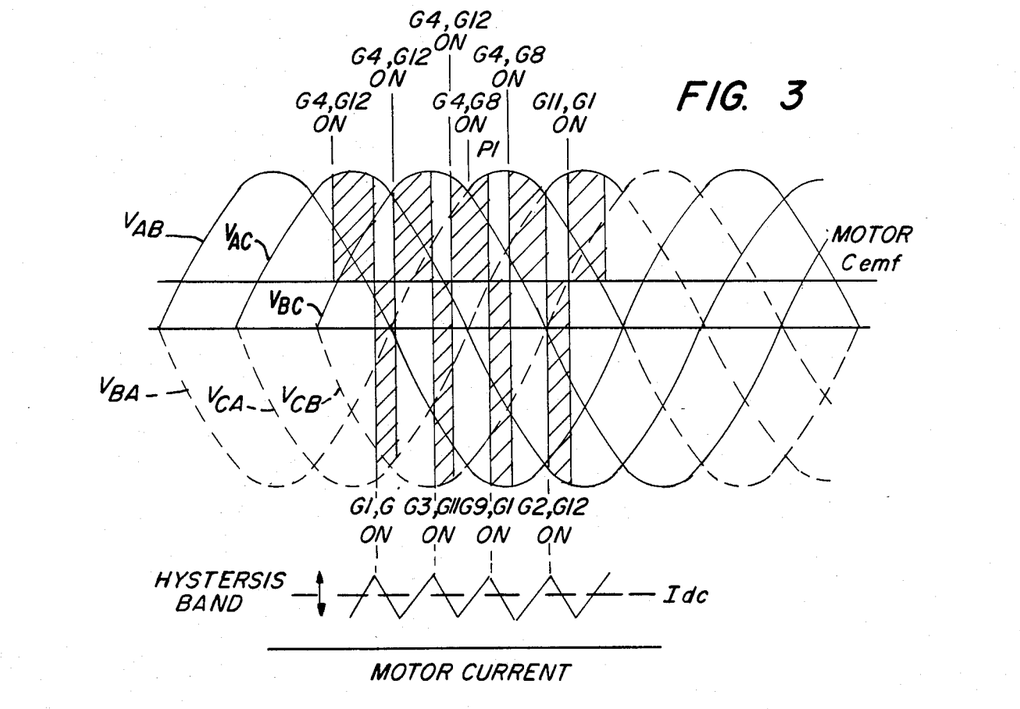
FIG. 3 shows a typical voltage and current waveform for a motor driven by the circuit of FIG. 2.

Referring now to FIG. 3 there is shown typical voltage and current wave forms for a motor 12 driven by the circuit shown in FIG. 2. The switching rate selected is approximately 500 Hz. This low frequency was selected to make the drawing simple, actually gate turn off thyristors can be used beyond 10 KHz without derating. The shaded area is the volts second area imposed across the armature impedance of motor 12. The logic sequencing circuit 20 selects which gate turn off thyristor devices G1 through G12 should be turned on or off to provide the proper phase voltage across the motor windings. Note that at point P1 $V_{BA}$ becomes more positive than $V_{BC}$ and device G12 is turned off and device G8 is turned on.

Figure 7:
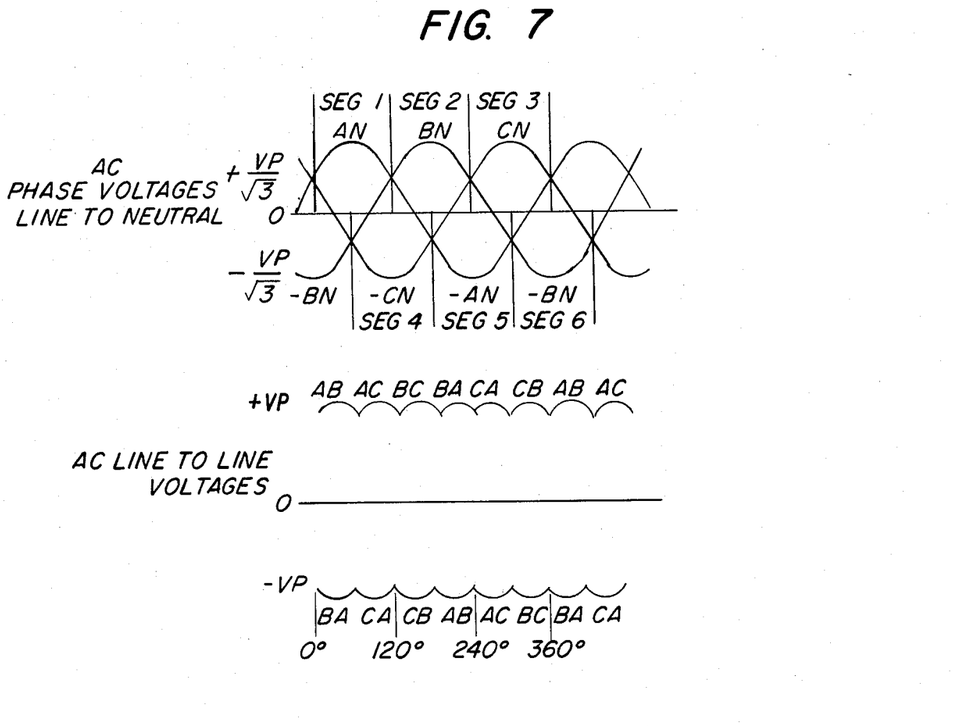
FIG. 7 shows the relative voltages of a three phase AC line.

Referring now to FIG. 7 there is shown the relative voltage of the three phase AC line with respect to neutral. It can be seen for FIG. 7 that if at any point of time the proper two phases are selected to supply power to the motor, a comparatively fixed positive or negative DC voltage will be present. The positive and negative envelopes indicated for the line to line voltages of FIG. 7 are the DC outputs which would be obtained from three phase full wave bridge rectifiers connected across the lines.

Figure 8:
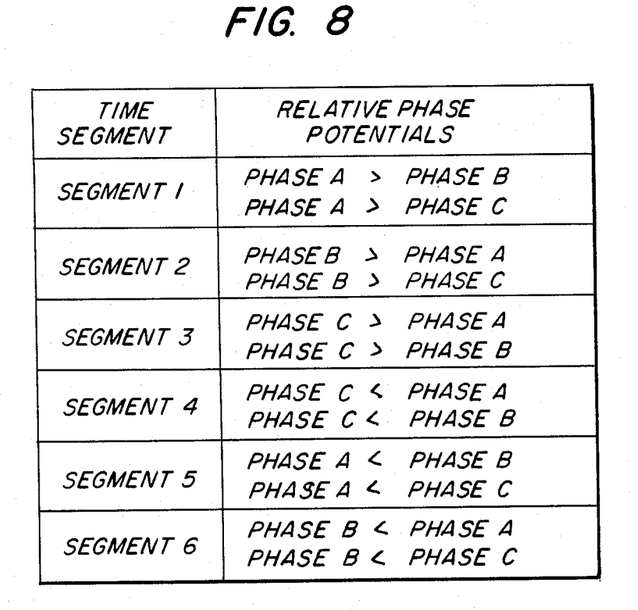
FIG. 8 is a table showing the logic comparisons performed by the sequencing logic of FIG. 10.
Figure 9:
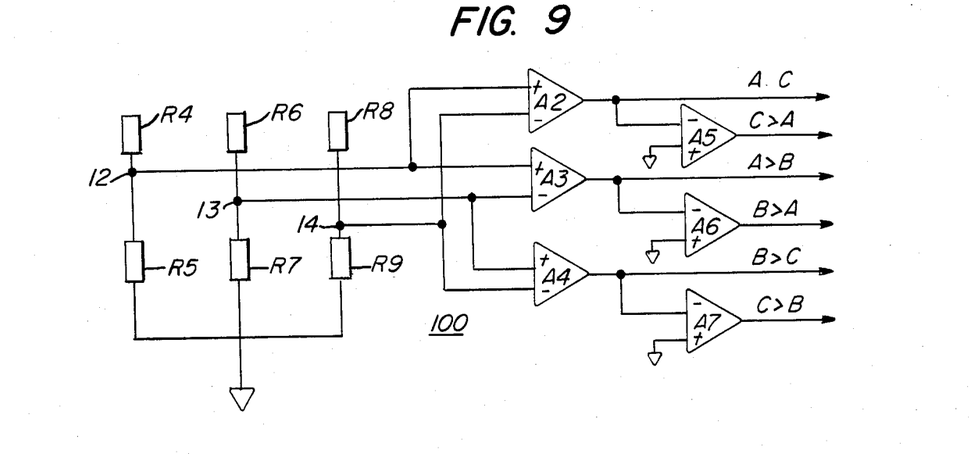
FIG. 9 is a schematic of the input sensing circuit utilized in the controller of FIG. 1.
Figure 10:
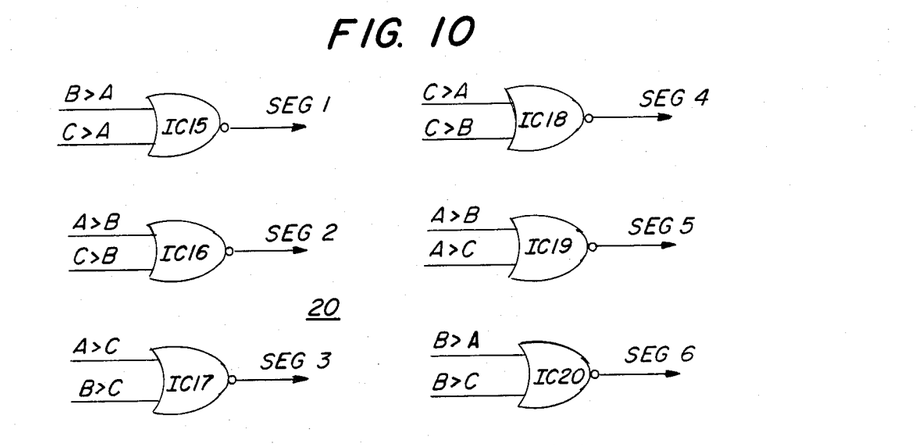
FIG. 10 is a schematic of the sequencing logic utilized in the controller of FIG. 1.

FIG. 9 shows the input sensing circuitry 100 which is utilized to sense the various line potentials. Resistors R4, R5, R6, R7, R8 and R9 comprise a voltage divider circuit. Points 12, 13 and 14 are voltages which represent the relative polarities of the three AC lines. The amplitude of the voltages at points 12, 13 and 14 will vary depending on the voltage potential of the common point. However, their relative polarities will not vary. Referring to FIG. 7, the time during which any particular phase will be required to supply power to, or receive power from, the motor are divided into individual segments. Six segments comprise one complete 360° cycle. Within any one segment the AC line phase, which will be utilized to produce or absorb power, will be either higher or lower in potential than both of the other phases. For example, phase A in segment 1 is at a higher potential than phase B or C. Likewise point 12 will be at a higher potential than points 13 and 14. FIG. 8 shows a table containing the relative phase potentials for each time segment. Operational amplifiers A2, A3, A4, A5, A6 and A7 provide an output indicating which phases are at higher potentials. These outputs are fed to sequencing logic 20 shown schematically in FIG. 10. Nor gates IC15, IC16, IC17 and IC18, IC19 and IC20 perform the logical comparison and combination listed in the table of FIG. 8. The outputs of these nor gates indicate within which time segment listed in FIG. 8 the controller is operated. The outputs of sequencing logic 20 are used to determine which output devices may be switched on at any particular time.

Figure 6:
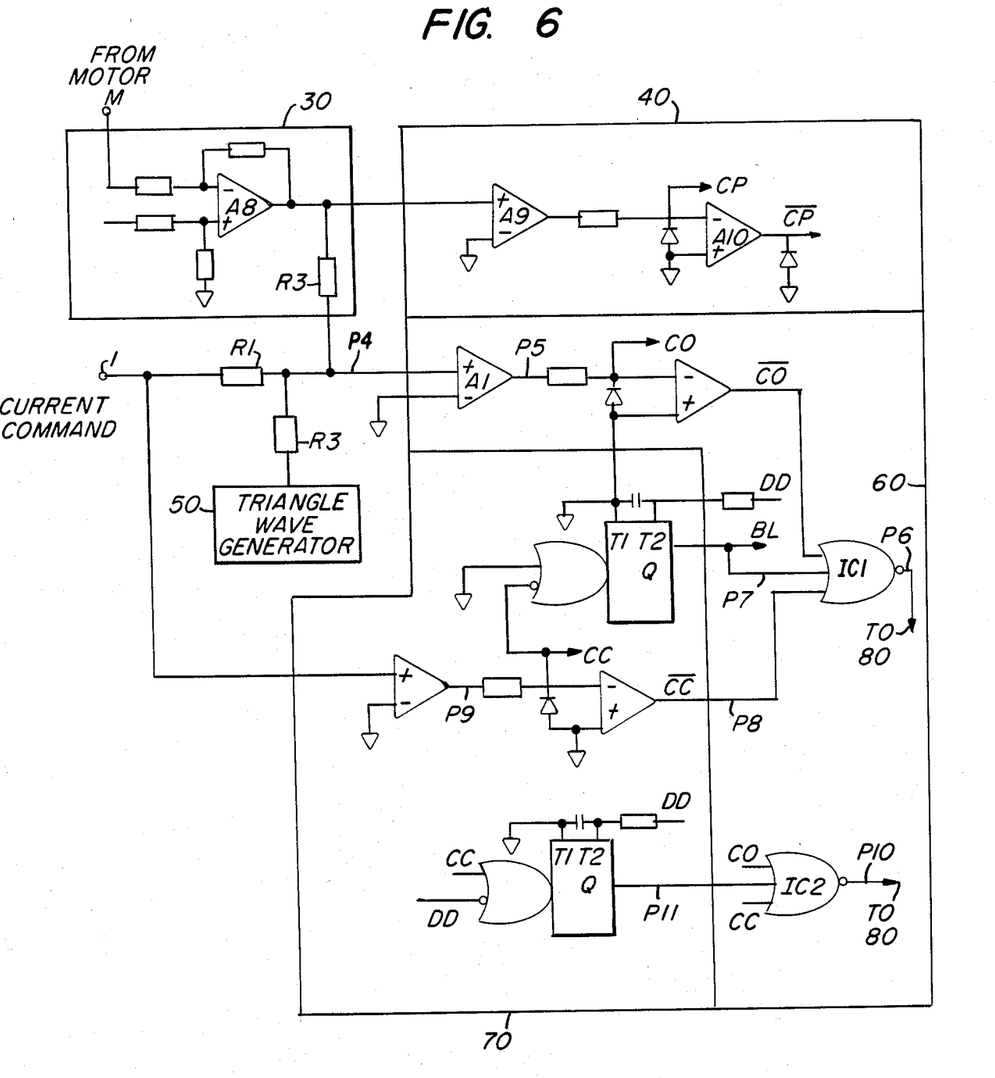
FIG. 6 is a schematic of the current feedback circuit, the triangle wave generator, the current decay detector circuit, the PWM comparitor and combining logic, and the blanking circuit utilized in the controller of FIG. 1.
Figure 11:
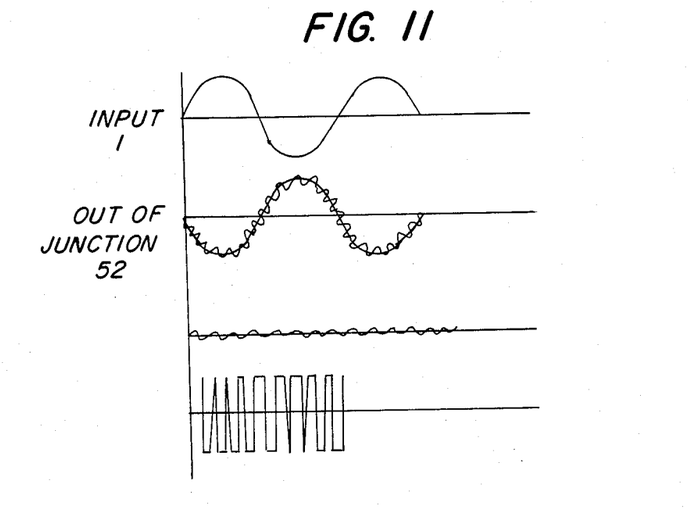
FIG. 11 shows the voltage waveforms at various points in the controller of FIG. 1.

Referring now to FIG. 6 there is diagrammatically shown current feedback circuitry 30, current delayed detection circuit 40, triangular wave generator 50, PWM comparing and combining logic 60 and the blanking circuit 70. Input 1 is provided to receive an analog signal which is representative of the desired motor current. The signal to input 1 is summed with a current feedback voltage signal at summing junction 52 which is proportional to motor current. The current feedback signal is provided through current feedback circuitry 30. A voltage proportional to motor current is obtained with sampling resistor R50, shown in FIG. 4. A 5 KHz triangular wave signal from triangular wave generator 50 is provided through resistor R3. The input current command signal, the current feedback signal, and the 5 KHz triangular wave are summed at summing junction 52 of operational amplifier A1. Summing junction 52 comprises resistors R1, R2 and R3. OP Amp A1 is configured as a voltage comparator referenced to signal common. The output of OP amp A1 will be a two state modulated signal, the duty cycle of which is proportional to the voltage required to produce the current command at input 1. FIG. 11 shows the waveform at the input 1 and points P4, P7 and P8 in the circuit of FIG. 6.

IC1 is a nor gate that determines when positive direct current is to be conducted through the motor. When IC1's output is high, appropriate output devices will be switched to their conducting state to supply positive current. The necessary conditions for IC1's output to be high are that point P5 is high and that points P7 and P8 are low. Point P8 will be low when the signal at input 1 is a positive value. Point P7 will remain low at all times except for a twenty micro second period following a positive transition of point P9, which corresponds to a transistion from negative to positive voltage of the command signal at input 1. This time delay provided by blanking circuit 70 is inserted to prevent line to line switch through current.

Similarly, IC2 is a nor gate that determines when negative direct current is to be conducted through the motor. When IC2's output is high appropriate output devices in bridge 90 will be switched on to supply negative current. The conditions necessary for IC2's to be high are that points P5, P9, and P11 are all low. Point P9 will be low when the signal at input 1 is a negative value. Point P11 will remain low at all times except for a 20 microsecond period provided by blanking circuit 70 following a negative transistion of point P9. This corresponds to a transistion from positive to negative voltage of the command signal at input 1. This time delay is inserted to prevent line to line switch through current.

Figure 5:
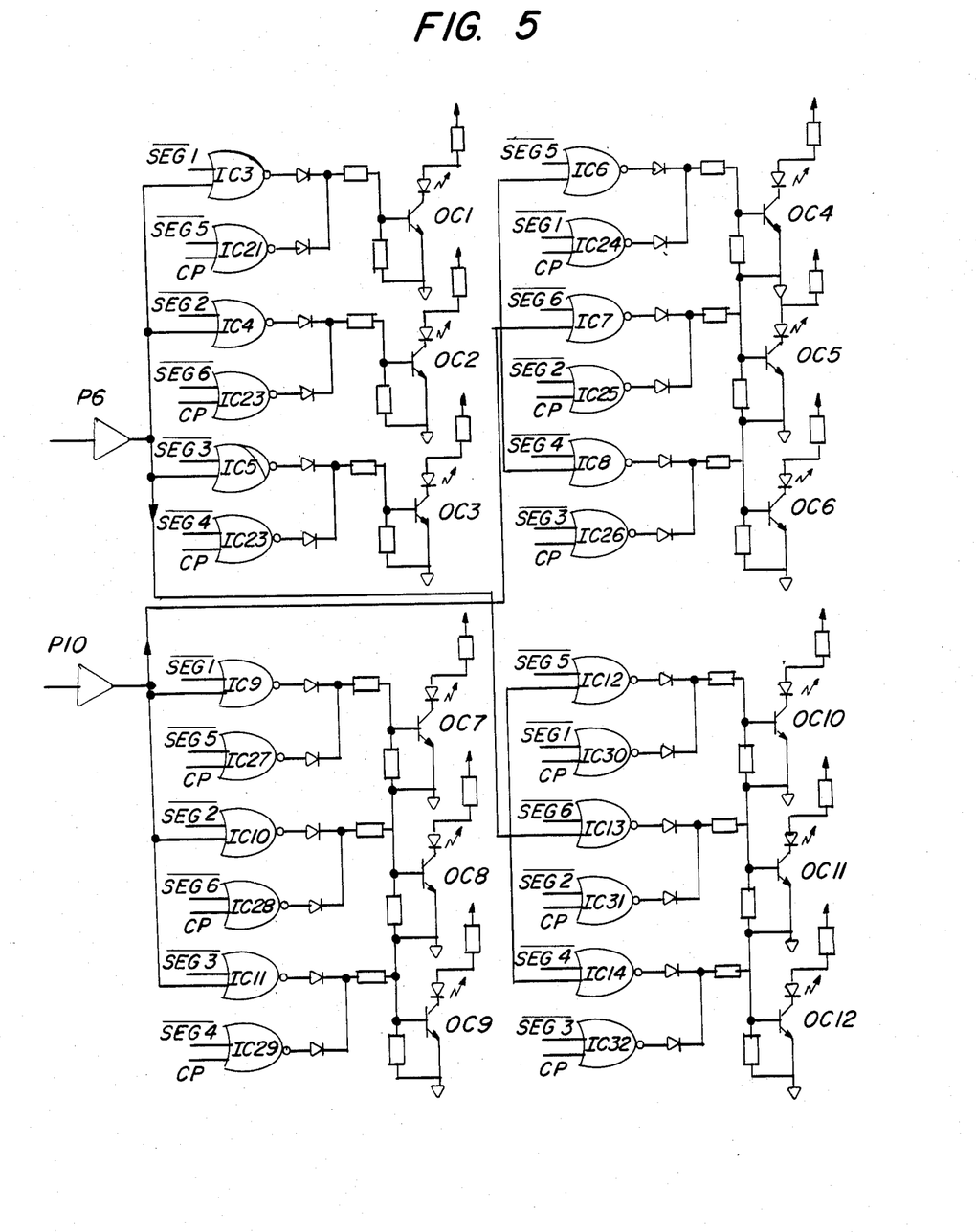
FIG. 5 is a schematic of the output selection and drive circuit for the controller shown in FIG. 1.

The outputs of IC1 and IC2 which are a two state modulated signals required to control the motor 12 voltage and current are then supplied to the output selection and drive circuitry 80, shown in FIG. 5. Line segments are selected by sequencing logic circuit 20 and this information along with the two state modulated signals from IC1 and IC2 are processed through nor gates IC3 through IC14 to select the proper output devices for direct motor current conduction. These output devices are driven through optical coupler OC1 through OC12 which provide the necessary electrical isolation between the control logic and the output devices.

Figure 4:
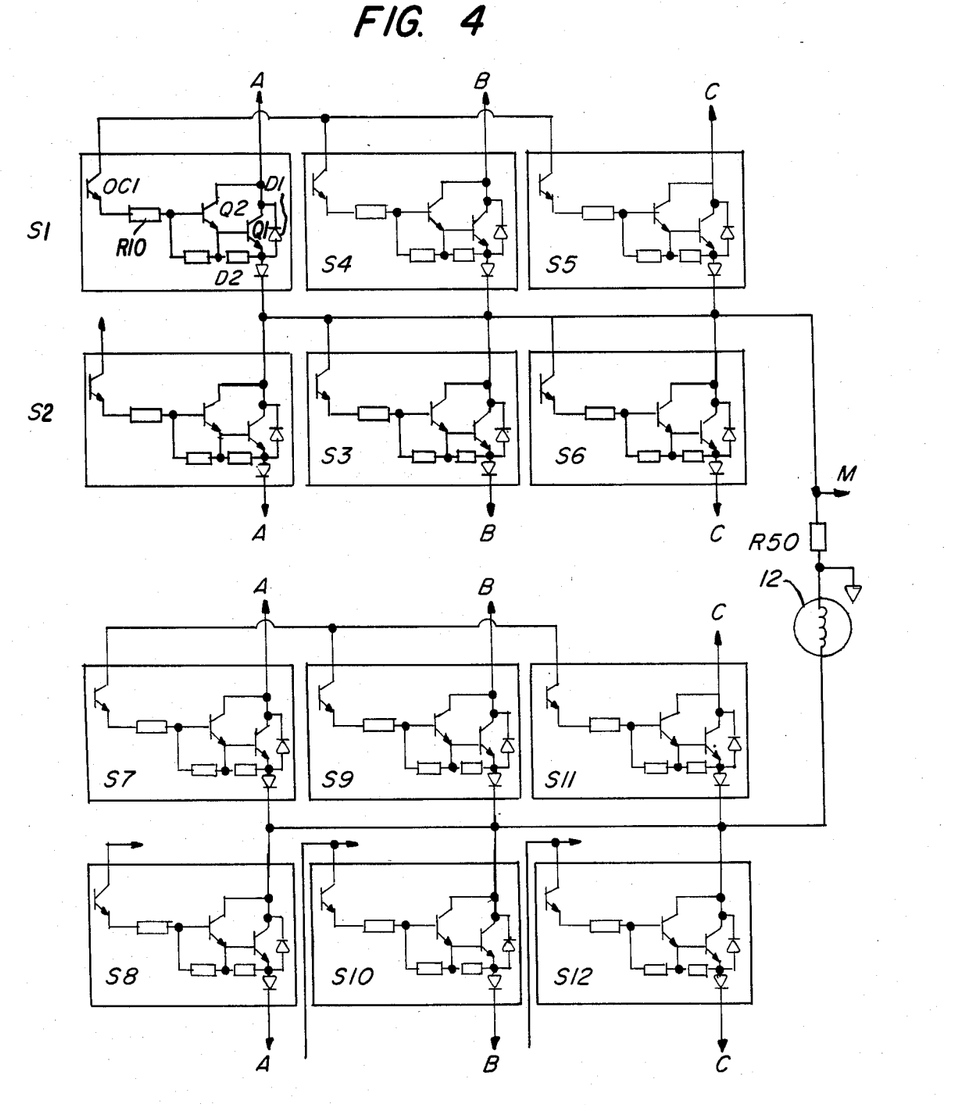
FIG. 4 shows another embodiment of a controlled switching bridge connected output.

Referring now to FIG. 4 there is shown another embodiment of the output bridge circuitry 90. The output bridge is composed of 12 switchable output members, S1 through S12, which connect both terminals of the motor the three AC power lines as shown in FIG. 1. Each connection is made through a pair of elements connected in anti-parallel to allow current flow in either direction. The single output member S1 is composed of a power darlington output transistor Q1 which is connected in anti-parallel with a protection diode D1 used to prevent reverse voltage break down of the transistor's collector-emitter junction. The power darlington Q1 is driven by a driver transistor Q2 which in turn is driven by an optical coupled photo transistor OC1. Power for production of base drive current is provided by an appropriate transformer. Power supply transformer have five independent secondaries connected to full wave bridge rectifiers. One of these bridges produces a five volt DC output which is converted into transistor base current through dropping transistor R10 when OC 1 is energized. Diode D2 is added to present reversed current from flowing through Q1.

The motor connected in series with sampling resistor R50. The common point between the motor and R50 is the signal common of the control electronics. Motor current is sampled by way of resistor R50 and this information is supplied to the two state modulation circuit through A8 which is configured as a differential amplifier. Normal direct current conduction flows from the higher potential AC phase through the motor 12 and sampling resistor R50, producing the proper current, and into the lowest potential AC line phase. The control of voltage and current is accomplished by switching on and off the selected control transistorized switches S1 through S12.

In addition to these direct current control transistor switches S1 through S12, which are selected as a function of the required current and AC line potentials, there are other output transistor switches which are energized during the same time segments. The function of these devices is to conduct free wheeling current which is stored in the inductive element of the motor winding, back to the AC line when the control transistor is deenergized. Operational amplifiers A9 and A10 sense the motor current polarity. This information in addition to the AC line time segments are processed by IC21 through IC32 to select the proper switching device S1 through S12 to conduct the free wheeling current. During periods of direct current conduction these free wheeling conduction devices are reversed biased and reverse current is inhibited by their protection diodes D1. Regenerative energy created by the motor is returned to the AC line in this manner. In FIG. 4 the output devices selected are transistors. However any similar device capable of triggered commutation such as gate turn off thyristors, SCR's or the like would be an acceptable alternative.

What is claimed is:
1. A high response switching controller, having a power input for connection to multi-phase power lines and a power output for supplying power to a load, comprising:
  means for receiving an input current demand signal and a signal related to the current actually produced by the controller and generating a difference signal related to the difference between said demand and actual current signals;
  a bridge configured output connected between the power input and the power output;
  said bridge configured output comprises a plurality of controller switching means for switching on and off in response to a control signal and each of which is directly connected between the power input and the power output;
  said plurality of controlled switching means disposed to supply power to the load for the power lines and to supply power from the load to the power lines;
  sequencing logic means for selecting the power lines having the greatest magnitude of potential difference therebetween; and
  output selecting and drive circuit means responsive to said sequencing logic and said difference signal for switching on and off the controlled switching devices connected between the lines selected by said sequencing logic to provide the current demanded by the input current demand signal.

2. A high response switching controller as claimed in claim 1 wherein said difference signal generating means comprises:
  current feedback circuitry for producing a current feedback signal proportional to load current;
  a wave generator for providing a periodic signal which is independent of the line frequency; and
  a summing junction for summing said input current demand signal, said current feedback signal and said periodic signal and providing an output of the combined signals to said output selecting and drive circuit means for controlling the switching on-off duty cycle of the controlled switching devices.

3. A high response switching controller as claimed in claim 2 wherein:
  said controller switching means comprises a gate turn off thyristor and a diode connected around each gate turn off thyristor.

* * * * *

UNITED STATES PATENT AND TRADEMARK OFFICE
CERTIFICATE OF CORRECTION

PATENT NO. : 4,495,557
DATED : January 22, 1985
INVENTOR(S) : JAMES G. WEIT

It is certified that error appears in the above-identified patent and that said Letters Patent is hereby corrected as shown below:

Column 3, line 38, change "thrysistor" to --thyristor--.

Column 3, line 39, delete "with".

Column 5, line 18, delete "a".

Column 5, line 35, after motor, insert --to--.

Column 5, lines 46-47, after "appropriate", change "transformer. Power supply transformer have" to --power supply transformer having--.

Column 5, line 51, change "present" to --prevent--.

Column 5, line 53, after "motor", insert --is--.

Column 6, line 12, change "reversed" to --reverse--.

Claim 1, line 33, change "controller" to --controlled--.

Claim 1, line 38, change "for" to --from--.

Signed and Sealed this

Twenty-sixth Day of November 1985

[SEAL]

Attest:

DONALD J. QUIGG

Attesting Officer    Commissioner of Patents and Trademarks